United States Patent [19]
Ohta

[11] Patent Number: 5,097,871
[45] Date of Patent: Mar. 24, 1992

[54] PIPE FOR PIPE JACKING

[75] Inventor: Masahiro Ohta, Osaka, Japan

[73] Assignee: Kurimoto, Ltd., Osaka, Japan

[21] Appl. No.: 645,303

[22] Filed: Jan. 24, 1991

Related U.S. Application Data

[63] Continuation of Ser. No. 308,618, Feb. 10, 1989, abandoned.

[51] Int. Cl.$^5$ .............................................. F16L 11/02
[52] U.S. Cl. .................................... 138/149; 138/109
[58] Field of Search ............... 138/109, 103, 149, 172; 285/149

[56] References Cited

U.S. PATENT DOCUMENTS

| | | | |
|---|---|---|---|
| 3,279,003 | 10/1966 | Yates | 138/109 |
| 3,516,447 | 6/1970 | Pittman | 138/109 |
| 3,864,908 | 2/1975 | LaHaye | 138/149 |
| 4,114,657 | 9/1978 | Longenfeld | 138/109 |
| 4,240,470 | 12/1980 | McPherson et al. | 138/109 |
| 4,345,625 | 8/1982 | Mayumi et al. | 138/109 |
| 4,361,336 | 11/1982 | Rech et al. | 138/109 |
| 4,432,396 | 2/1984 | Dausson et al. | 138/109 |
| 4,778,202 | 10/1988 | Schülke | 138/109 |

FOREIGN PATENT DOCUMENTS

| | | |
|---|---|---|
| 63-12697 | 8/1988 | Japan . |
| 4051 | of 1897 | United Kingdom ................ 138/109 |

Primary Examiner—James E. Bryant, III
Attorney, Agent, or Firm—Jones, Tullar & Cooper

[57] ABSTRACT

In pipe jacking wherein a pipe line is formed by horizontally inserting pipes one by one from a vertical pit without moling the ground, a pipe of spigot and socket type to be used is coated with such material as concrete to form an uniform common external diameter from a flange section with its external diameter enlarged to a spigot section, a pipe whose external surface is covered with another smooth outer pipe so as to make the external surface smooth and reduce frictional resistance is provided.

4 Claims, 1 Drawing Sheet

PIPE FOR PIPE JACKING

This is a continuation of co-pending application Ser. No. 07/308,618 filed on Feb. 10, 1989 now abandoned.

BACKGROUND OF THE INVENTION

1. Field of the Invention

The present invention relates to a pipe for use in pipe jacking.

2. Prior Art

Hitherto, as illustrated in FIG. 2, a pipe 50 for pipe jacking has been used in which, for the purpose of protection of an external surface, a ductile cast iron pipe body 51 of socket and spigot type is coated with reinforced concrete or mortar 52 to form a uniform common external surface. When carrying out the pipe jacking, a flange 53 provided on the spigot side at the front end of a succeeding pipe is brought into contact with an end face of the socket at the rear end of a preceding pipe, thereby transmitting a required jacking force. Reference numeral 54 indicates a mortar lining provided on the internal surface of the pipe body 51, numeral 55 indicates an annular water-sealing rubber packing, numeral 56 indicates bolt and nut pair, the blot being screwed in a tapped hole provided at the end face of the spigot of the preceding pipe to connect the socket at the end face of the preceding pipe to the flange 53 of the succeeding pipe, then fastened with the nut. Reference numeral 57 indicates a reinforcing rib, and numeral 58 indicates a welded reinforcing bar or a wire net.

In the pipe 50 of the above construction according to the prior art, the pipe body 51 is coated with reinforced concrete or mortar 52 to form a uniform common external surface. If the external surface of the coating mortar 52 is rough, frictional resistance during jacking increases, and therefore it is necessary for the rough external surface of the mortar 52 to be manually finished before jacking to make the rough external surface smooth. Further, it may be said that frictional resistance between the coating mortar 52 and the earth is generally so large that smooth jacking is difficult. As a result, relatively large-scale equipment is needed, and if carrying jacking is carried forcibly, the coating mortar 52 itself is easily broken or damaged. Moreover, when it becomes necessary to install some branch pipe, valve or the like midway of a pipe line of pipes after installing the pipe line by pipe jacking, a pipe forming the pipe line must be cut at the working spot. A serious problem exists in that a pipe such as the aforementioned pipe 50 incorporating the reinforcing bars or wire net 58 in the coating mortar 52 is very tough and difficult to cut, eventually resulting in troublesome work or delay in the work.

SUMMARY OF THE INVENTION

The present invention was developed to solve the problem mentioned above and has as an object of providing a novel pipe for pipe jacking whose frictional resistance to the earth is reduced, as compared with the conventional mortared pipe mentioned above, so that pipe jacking may be carried out smoothly with a smaller jacking force and that so the pipe may be cut easily for installing a branch pipe or the like.

In order to accomplish the foregoing object, in the pipe for pipe jacking in accordance with the invention, an annular flange is provided on a spigot of an iron pipe body of socket and spigot type, an outer pipe having a smooth external surface is fixedly placed between an outer edge of the flange and an outer edge of the socket of the pipe body, and an annular gap formed between the outer pipe and the pipe body is filled with a filler such as sand or foaming mortar.

As a result of adopting the technical means of the above construction, the external surface of the outer pipe which corresponds to that of the coating mortar in the prior art is smoother and frictional resistance during pipe jacking is reduced. Thus, pipe jacking can be carried out smoothly without trouble by means of smaller-scaled equipment. Because the external surface is the outer pipe itself, there is no longer any need for the manual finishing thereof as is done in the mortar surface according to the prior art, and the entire pipe line is protected from damage or breakdown. In addition, when cutting a pipe for pipe jacking in order to install a branch pipe or the like, the objects to be cut are only the outer pipe and the filler other than the pipe body, and there is no reinforcing bar or wire net. As a result, cutting can be carried out speedily and efficiently, and installation of a branch pipe, etc. is very simple.

As a further advantage, because the pipe cutting is easy a as mentioned above, provision of only a small vertical pit is quite sufficient, the vertical pit provided as a midway pit being essentially required for installation of a branch pipe or the like according to the prior art. Because frictional resistance to the earth is reduced by adoption of the outer pipe, pipe jacking to form a longer pipe line is now achieved. A steel outer frame required for application of mortar is no longer necessary by disposition of the outer pipe, and pipe manufacturing is simple and easy. The disadvantage such as breakage or damage to a pipe due to shock, peculiar to the conventional pipe coated with mortar when transferring or conveying the pipe, can be significantly reduced because of the disposition of the outer pipe placed in substitution for the mortared surface.

Other objects and advantages of the invention will become apparent in the course of the following description with reference to the accompanying drawings.

DESCRIPTION OF THE PREFERRED EMBODIMENT

Figure 1:
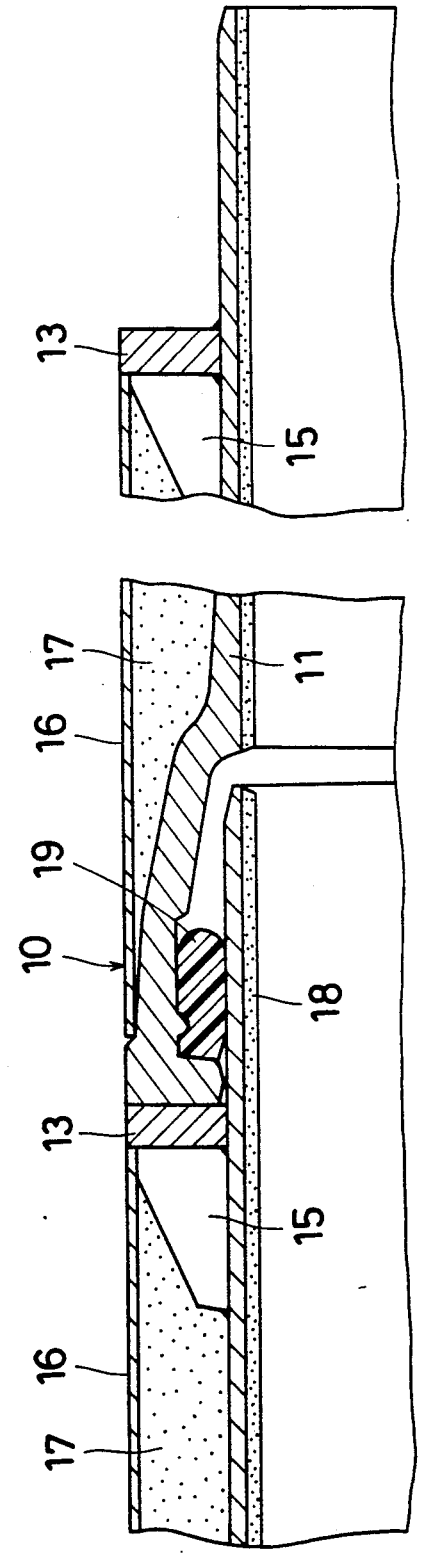
FIG. 1 is a longitudinal sectional view illustrating an embodiment in accordance with the present invention.
Figure 2:
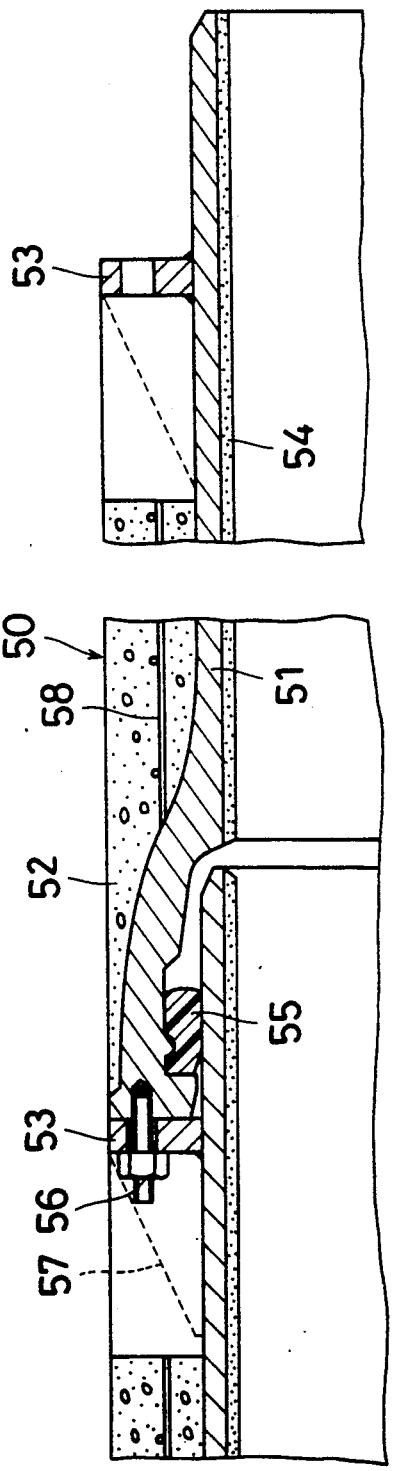
FIG. 2 is a longitudinal sectional view illustrating the prior art.

In FIG. 1, reference numeral 10 indicates a pipe for use in pipe jacking comprising a ductile cast iron pipe body of socket and spigot type, and an annular flange 13 welded to the spigot side at the front end of the pipe 10. The external diameter of the flange 13 is made substantially equal to the that of the socket at the rear end of the pipe 10. Numeral 15 indicates a reinforcing rib, and an outer pipe 16 of resin having a smooth external surface is fixedly inserted between the outer edge of the flange 13 adjacent the rib 15 and the outer edge of the socket in such a manner as to form a uniform common plane with the outer peripheries of the flange 13 and the socket, which is coaxial with the pipe body. An annular gap formed between the outer pipe 16 and the pipe body 11 covered with the outer pipe 16 including the rib 15 is filled with a filler 17 such as sand or foaming mortar, such as a cement mortar. Numeral 18 indicates a mortar lining and numeral 19 indicates an annular water-sealing rubber packing, both being the same as the prior art.

In the embodiment, pipes 10 are jacked i.e., forcibly advanced, one after another from the starting pit to the arriving pit, after connecting the socket at the rear end of the preceding pipe to the spigot at the front end of the succeeding pipe by insertion through the annular rubber packing 19. During pipe jacking, the flange 13 provided on the spigot side at the front end of the succeeding pipe is brought into contact with the end face of the socket at the rear end of the preceding pipe for transmitting the jacking force.

Though the outer pipe 16 is made of resin in the foregoing embodiment, any material in addition to resin is available so long as it has a smooth external surface. Any filler other than the filler 17 used in the foregoing embodiment can also be useful. Thus, it will be easy for a person skilled in the art to change or modify the foregoing embodiment without departing from the spirit and scope of the present invention.

What is claimed is:

1. A pipe for use in pipe jacking, comprising:
   a pipe body having a socket at one end and a spigot extending along its other end thereof;
   an annular flange mounted to said spigot, said annular flange having an outer pipe engaging surface;
   an outer pipe having a smooth external surface fixed to and extending between the outer pipe engaging surface of said flange and the outer surface of said socket, said outer pipe, flange, spigot and socket defining an annular gap filled with a filler; and
   a reinforcing rib situated in said annular gap and engaging said flange, said spigot and said filler.

2. The pipe as defined in claim 1, wherein the pipe body as iron.

3. The pipe as defined in claim 1, wherein the filler is sand.

4. The pipe as defined in claim 1, wherein the filler is foaming mortar.

* * * * *